Jan. 7, 1941.  P. GAVIN  2,227,642
AIRCRAFT
Filed Dec. 18, 1939  3 Sheets-Sheet 1

INVENTOR.
PATRICK GAVIN
BY Cornelius Falniske
ATTORNEY.

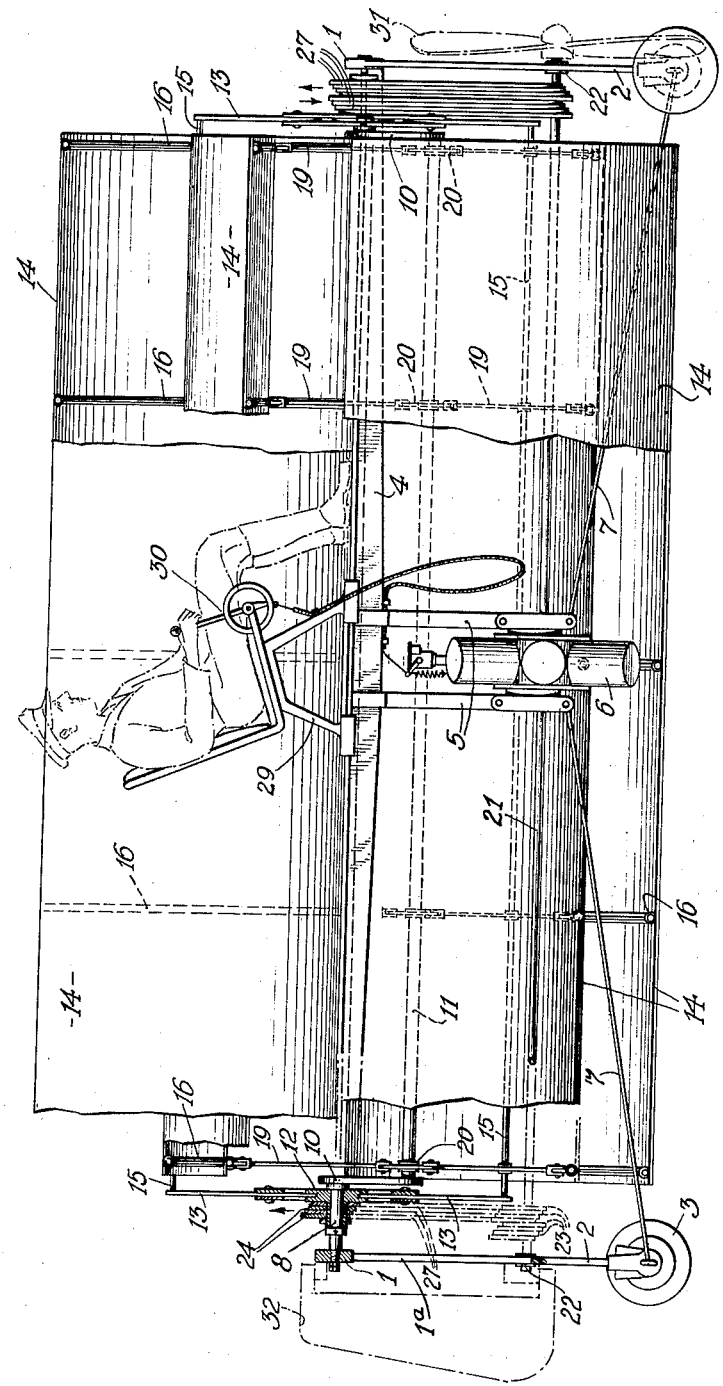

Jan. 7, 1941.                P. GAVIN                2,227,642
                             AIRCRAFT
                      Filed Dec. 18, 1939        3 Sheets-Sheet 3
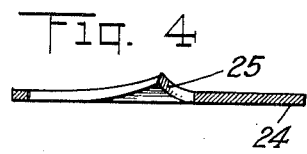
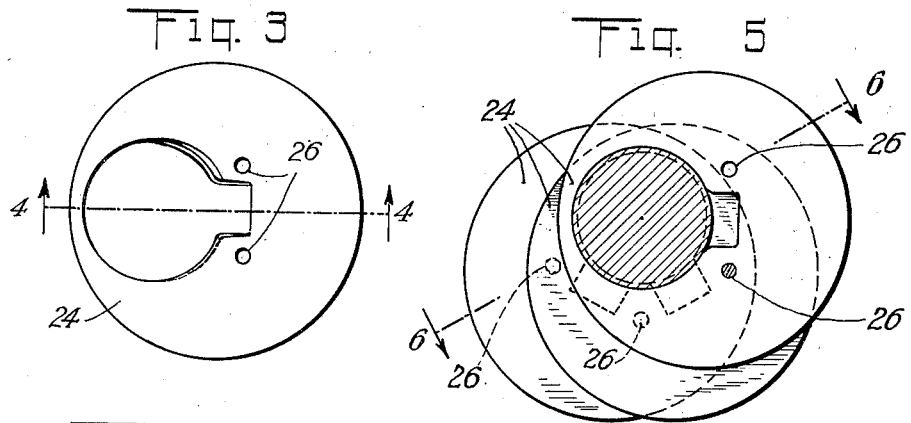
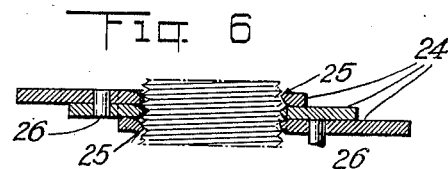
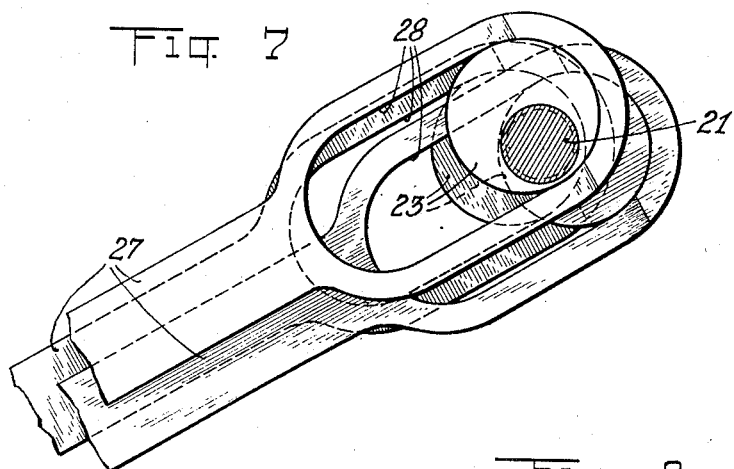
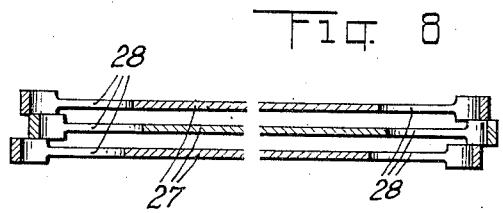
INVENTOR.
PATRICK GAVIN
BY Cornelius Zabriskie
ATTORNEY.

Patented Jan. 7, 1941

2,227,642

UNITED STATES PATENT OFFICE 2,227,642

AIRCRAFT

Patrick Gavin, Brooklyn, N. Y.

Application December 18, 1939, Serial No. 309,838

2 Claims. (Cl. 244—20)

This invention is directed primarily to novel aircraft construction so constituted that it is adapted to rise vertically off of the ground or to descend to a soft safe landing in a vertical direction, although certain features of the invention are adapted for other application in the various arts in dealing, more particularly, with the movement of air or the reaction resulting from the operation of the device upon atmospheric air.

The invention is primarily characterized by the employment of a plurality of vanes preferably of scoop-like character mounted for bodily pivotal movement around a common axis and each individually pivoted for independent movement and connected together in such a way as to have a feathering effect as the vanes are rotated, whereby they are adapted, when used in aircraft construction, to exert a lifting force with a minimum resistance against the operation of such force which would tend to offset their lifting action.

In the preferred form of the invention, as employed in aircraft, a plurality of sets of these vanes are employed and these sets are arranged in pairs adapted to be rotated in opposite directions about relatively fixed parallel axes, so that collectively they have a stabilizing effect upon one another which makes it possible for the craft to descend in a vertical direction under the complete control of the operator. Two sets of vanes are preferably employed and they are mounted for rotation in counter directions upon an appropriate frame carrying a motor from which they are driven and appropriate provision is made for a pilot and one or more passengers and appropriate controls are arranged within easy access of the pilot, so that he may have complete control of the apparatus at all times. The seat for the pilot may be of the sliding type, so that through such movement of the seat, the frame with rotating vanes thereon may be tilted to control the direction of flight. In addition a propeller may be associated with the device and a suitable steering rudder, as will hereinafter be more fully explained.

In addition to use in aircraft construction, the pivoted vane assemblies may be employed to bring about the circulation of air in air circulatory systems or for any other purpose where this arrangement may be commercially employed, as will also be hereinafter described.

Features of the invention, other than those referred to, will be apparent from the hereinafter detailed description and claims when read in conjunction with the accompanying drawings.

The accompanying drawings illustrate different practical embodiments of the invention, but the constructions therein shown are to be understood as illustrative, only, and not as defining the limits of the invention.

Figure 2 is a central side elevation with certain parts broken away in the interest of clearness.

Figure 3 shows one of several eccentric disks illustrated in Fig. 2 and useful for driving the rotary vane assemblies from the motor shaft.

Figure 4 is a section on the line 4—4 of Figure 3.

Figure 5 shows a plurality of disks of Figures 3 and 4 assembled on the motor shaft.

Figure 6 is a section on the line 6—6 of Figure 5.

Figure 7 shows the manner in which a plurality of links cooperate with the eccentrics of each of the vane assemblies to drive the latter in the desired direction.

Figure 8 shows a plurality of these links in central section.

Figure 1:
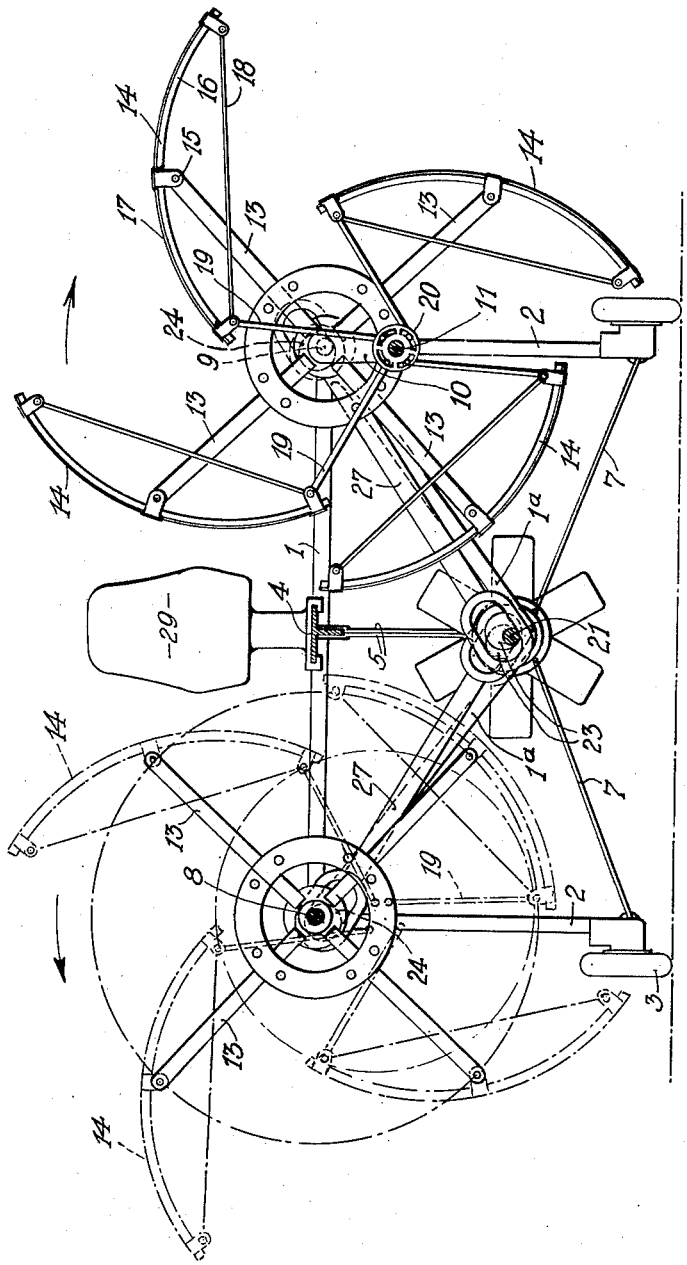
Figure 1 is an end view of aircraft embodying the present invention.

The aircraft shown in Figs. 1 and 2 of the drawings embodies a frame comprising two end sections. Each end section has a horizontal bar 1, a depending V-shaped hanger 1a, and two upright bars 2 rigid with the horizontal bar and provided at their lower ends with wheels 3. The end sections are connected by one or more longitudinal bars 4, the center one of which is of T-section and from this center bar links 5 are suspended for supporting an internal combustion engine 6. Stay links 7 serve to impart to the whole frame construction a substantially rigid relation, while producing a framework which is relatively light.

Journalled in the end sections are the trunnions 8 and 9 of two similar crank shafts, each of which have cheeks 10 supporting off center rods 11. These two cranks are mounted at the upper corners of the frame, so as to extend in parallel relation from one end of the frame to the other, but with the rods having a throw substantially equivalent to the lengths of the cheeks 10. Both of these crank shafts are, however, mounted rigidly against rotation and occupy fixed positions.

Mounted for rotation on each of the trunnions 8 and 9 at the ends of the respective crank shafts are hubs 12. Each of these hubs is in the form of a sleeve freely rotatable on one of the trunnions of the crank shaft and radiating from each of these hubs are a plurality of relatively rigid arms 13 of any number, but four are shown for each hub, so that by this arrangement the hubs with the arms are free to turn on the trunnions. Instead of arms 13, a disk may be substituted, however, for each set of arms.

The hubs and arms, which are associated with the trunnions of each crank shaft, collectively constitute a rotor which is rotatable on the axis of said trunnions and on each of these rotors is pivoted a number of vanes 14, which are, in the structure shown, carried by pivots 15 at the outer ends of the arms 13. These vanes are preferably scoop shaped and are preferably curved on an arc, the radius of which is approximately that of the radius of the rotor arms 13, so as to offer the minimum resistance to the passage of the vanes in an edgewise direction, but have the maximum efficiency when acting flatwise upon the air for imparting lift to the craft. They may be fabricated in any desired way but are shown as embodying a plurality of ribs 16 over which is positioned suitable covering of canvas, sheet metal, plywood, or the like 17. The structure is reinforced by strengthening chordal ties 18 to impart the requisite strength, with lightness of construction.

As shown the vanes are pivoted substantially midway of their widths to the outer ends of the arms 13, while their trailing ends are connected by pivotal links 19 to a disk 20 mounted on the crank rod 11 to freely rotate thereon. The connection between the links 19 and the corresponding disk 20 is a slotted connection, as shown best in Fig. 1, so as to permit of a flexibility of operation in the connection thus provided.

In the arrangement as shown in Fig. 1, the cheeks 10 of the crank shafts extend downwardly from their trunnions 8 and 9, so that the crank rods 11 are in stationary position directly below these trunnions at all times. Consequently, as the hubs 12 are rotated, carrying with them the arms 13 and the vanes 14, the inboard ends of the vanes will be held in substantially fixed relation to the crank rods 11 and, because of the eccentricity between these crank rods and their trunnions, the vanes will be shifted on their pivots 15, so as to descend in a direction substantially normal to their chords and to ascend with their chords in inclined relation. By virtue of this arrangement the vanes will have a maximum lifting effect as they descend and a feathering effect as they ascend. When the two sets of vanes shown in Figure 1 are rotated in opposite directions, the opposite sides of the machine will thus be subjected to the same lifting forces and when the vanes are driven from the motor 6 as presently described the structure will be lifted from the ground with a greater or lesser speed according to the engine speed and will be lowered to the ground as the speed of the engine is decreased beyond that required to sustain the weight of the craft.

Various means may be provided for driving the vanes from the motor 6. For example, chains or gearing with appropriate shafting may be utilized for this purpose. For illustration, however, I have shown an efficient system of eccentrics and links which will now be explained in detail.

In the arrangement shown, the motor shaft 21 extends for substantially the full length of the machine and is journalled in outboard bearings 22, supported by the hangers 1a, which form parts of the respective end sections of the frame.

Fixed on the motor shaft 21 adjacent these outboard bearings are a plurality of eccentric disks 23 arranged in different angular relations to one another and rigid with said shaft and fixed on the hubs 8 and 9 of the respective crank shafts are complementary eccentric disks 24. Details of the latter disks are shown in Figs. 3-6. Said disks 24 have perforations to fit over the hubs 12 and the margins of these perforations are offset, as shown at 25 in Figs. 4 and 6. The hubs 12 are threaded and by virtue of the offsets 25 the disks may be screwed on to the threaded portions of the hubs one after the other. The innermost disk is thereupon pinned to the hub by a pin passing through a hole 25, as shown in Figures 5 and 6, and additional pins 26 are passed through consecutive disks to successively secure them to one another in proper angular relation. Relatively light strap pitmans 27 connect the corresponding eccentric disks 23 and 24 with the opposite ends of the pitmans slotted as at 28 to operatively embrace the disks of the hub and engine shaft. The disks are set in such angular relation with one another on the shaft and on the hubs that the pitmans will act as tension members to produce a substantially constant flow of power from the engine shaft to the hubs 12 and thus effect rotation of the hubs at opposite sides of the machine in opposite directions.

A pilot indicated in Fig. 2 is adapted to occupy a seat 29 mounted for sliding movement longitudinally of the center bar 4 and associated with said seat is suitable engine control means 30 whereby the operations of the engine may be manually controlled to change engine speed in accordance with the desires of the operator. The speed of the engine will control the effective operation of the vanes to raise or lower the craft while longitudinal sliding movement of the seat will vary the center of weight in such manner as to tilt the craft and thus control its direction of movement. If the operator is so positioned that the center of weight is at the center of the machine, the craft will rise vertically and descend vertically. If the weight is moved forward of the center of gravity of the craft, the machine will tilt forward, so that as it rises from the ground it will tend to move in a forward direction. If the weight is moved aft, the ship will be tilted rearwardly and will move in a like direction as it elevates. I may, if desired, attach to the forward or rear end of the engine shaft a propeller 31 and by suitable connections, preferably through a friction clutch, control the operations thereof from the pilot seat. Likewise I may, if desired, provide a rudder 32 with appropriate rudder lines to the pilot seat, so that the direction of flight may be more accurately controlled.

By the means described, it is further possible for the craft to rise vertically or in a fore or aft inclined direction and to descend in a like manner at the will of the operator.

In the foregoing description, the aircraft has been described as controlled by a pilot thereon. For some uses, as, for example, with observation balloons and other uses where it may be desired to have the craft rise in the air to a definite elevation and remain at such elevation to be controlled from the ground, pilot control may be eliminated and the construction may be controlled solely from cables attached to the device and extending to the ground in which event the cables may be attached to the opposite ends of the structure with a control cable leading to the motor which in this case may be electric, and fed with energizing current through a cable from the ground with appropriate controls at ground level. These and other uses will be apparent from the foregoing description and are within the present invention.

It will be noted from the foregoing description that vanes, operating as described, will effect a very substantial lifting power which is of utility in aircraft construction. I am aware, however, that a like vane arrangement may also be used to bring about circulation of air in air circulatory apparatus and therefore consider the vane assembly as an independent part of my invention when used in other connection than in aircraft construction.

Having thus fully described the invention, what I claim as new and desire to secure by Letters Patent is:

1. In an aircraft, a body frame, a pair of fixed axially spaced apart alined stub shafts carried by the frame on each side of the longitudinal medial plane thereof, a hub mounted to rotate on each stub shaft, arms rigid with and radiating from each hub, vanes extending between the corresponding arms of each pair of hubs and pivoted thereto, a stationary feathering rod extending parallel to each pair of alined stub shafts and off-center thereof, links connecting the vanes externally of their pivots to the associated stationary rod, an engine carried by the frame, and driving connections from the engine to each of the hubs individually.

2. In an aircraft, a body frame, a pair of fixed axially spaced apart alined stub shafts carried by the frame on each side of the longitudinal medial plane thereof, a hub mounted to rotate on each stub shaft, arms rigid with and radiating from each hub, vanes extending between the corresponding arms of each pair of hubs and pivoted thereto, a stationary feathering rod extending parallel to each pair of alined stub shafts and off-center thereof, links connecting the vanes externally of their pivots to the associated stationary rod, an engine carried by the frame, driving connections from the engine to each of the hubs individually, each of said driving connections comprising a plurality of thin circular disks eccentrically secured to each hub in different angular relations to one another, a corresponding series of thin circular disks correspondingly secured to the engine shaft, and a like number of light-weight tension strap pitmans having looped ends embracing the corresponding disks of the hub and engine shaft.

PATRICK GAVIN.